United States Patent [19]

Nichols

[11] 4,420,016

[45] Dec. 13, 1983

[54] KINK-PREVENTING SPINE FOR AQUARIUM AIR HOSES

[76] Inventor: Ralph A. Nichols, Box 289, Lee Vining, Calif. 93541

[21] Appl. No.: 337,579

[22] Filed: Jan. 7, 1982

[51] Int. Cl.³ ............................................. F16L 11/12
[52] U.S. Cl. ..................................... 138/103; 138/115; 138/116; 138/172; 138/37; 138/DIG. 6; 138/178; 138/108; 72/466; 119/5
[58] Field of Search ............... 138/103, 108, 110, 113, 138/114, 115, 116, 118, 148, 177, 178, 172, DIG. 8, 37, 38, 39; 72/465, 466; 46/27; D25/74; 119/5

[56] References Cited

U.S. PATENT DOCUMENTS

| 155,936 | 10/1874 | Fell | 138/108 |
| 889,323 | 6/1908 | Morgan | 138/37 X |
| 2,908,295 | 10/1959 | Beazley | 138/108 X |
| 3,092,222 | 6/1963 | Heinle | 138/172 X |
| 3,417,785 | 12/1968 | Andrews | 138/108 |
| 3,948,291 | 4/1976 | Persson | 138/108 X |
| 4,307,754 | 12/1981 | Muratsubaki | 138/108 |
| 4,327,775 | 5/1982 | Tally | 138/108 |

FOREIGN PATENT DOCUMENTS 243911  4/1926  Italy ..................................... 72/466

Primary Examiner—James E. Bryant, III
Attorney, Agent, or Firm—Duckworth, Allen, Dyer & Pettis

[57] ABSTRACT

A spine for flexible aquarium air hoses includes a plurality of rib members, each having at least three radially disposed ribs, and each adjacent pair of rib members are connected at the centers by a substantially flexible connecting member. The spine is inserted inside the flexible hose at areas where the hose is to be bent, thereby preventing kinking of the hose.

9 Claims, 5 Drawing Figures

KINK-PREVENTING SPINE FOR AQUARIUM AIR HOSES

BACKGROUND OF THE INVENTION

This invention relates to a spine for flexible hoses which can be inserted inside a hose to provide support when the hose is bent, thereby preventing kinking.

In aquariums there is a need to maintain a certain oxygen content in the water so that fish can survive. This is usually accomplished by means of an air pump to which a flexible air hose has been attached. The air hose is bent around the edge of the aquarium and is inserted into the water. Flexbile hoses are susceptible to kinking when bent over a tight radius. Such a kink in an air hose for an aquarium could prove fatal for the fish, since it would prevent the passage of sufficient air into the water.

The bending of tubing frequently causes a problem regardless of the type of material used for the tubing. The problem is one of collapse when the pipe or tubing is bent. Numerous devices have been developed to help prevent such a collapse; for example in U.S. Pat. No. 2,041,428 (Niles, 1934), a means of reinforcing tubing to prevent collapse during a bending operation is disclosed. The means described comprises a spring or tension member suitably positioned and mounted in the tubing where the bend is to be made, such spring or tension member being pinned or attached thereto and retained therein to additionally strengthen the tubing. In U.S. Pat. No. 1,675,574 (Mykins, 1928), a tool for bending lead pipe is disclosed, including a wound spiral coil of suitable diameter which can be reduced by the right hand twisting action of the spring. The spring is inserted into the pipe and serves to aid in the bending thereof.

In U.S. Pat. No. 2,451,717 (Check, 1948), a bending ball arbor is disclosed. Adapted to be positioned interiorly in tubing during the process of bending to insure a relatively smooth and accurate bend in the tube. The device is characterized by lengths securing several balls in related assembly, the lengths being held in position by pins which do not extend exteriorly at the balls, thus obviating the possibility of accidental placement of a pin during the bending operation, and consequently spoilage of the tubing and breakage of the bending apparatus. In U.S. Pat. No. 3,572,083 (Schmitt, 1981), a mandrel for use in effecting small radius seamless bends in rectangular wave guide tubes is disclosed. The mandrel is characterized by a plurality of individual elements secured together by separate shear pins which permit the elements to pivot relative to each other. One face is made at an angle in order to permit bends up to 180° with a minimum radius. These prior art are designed to be used with rigid pipes. One disadvantage is that with the exception of Milligan, the devices are designed to be removed from the pipe after the bending has been effecuated. Another disadvantage is that they are not particularly suitable for use with flexible hoses such as air hoses for aquariums.

SUMMARY OF THE INVENTION

The novel spine for flexible hoses is characterized by a plurality of rib members each having a plurality of radially disposed ribs and substantially flexible means for attaching the center of each of said rib members to the center of an adjacent one of said rib members. The spine for flexible hoses disclosed is designed so that it can be extruded in plastic. This yields the advantage of being able to extrude a spine of any length which can then be cut by the user.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
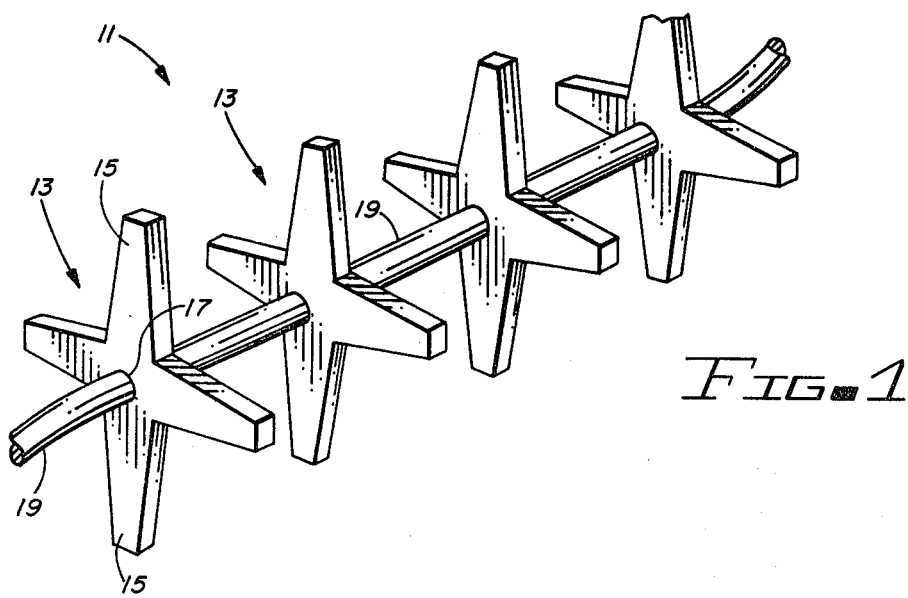
FIG. 1 is a perspective view of the spine for flexible hoses.
Figure 2:
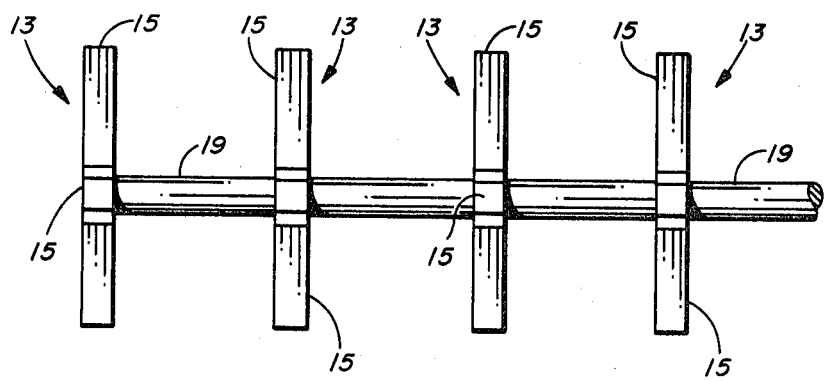
FIG. 2 is a side view of the spine for flexible hoses.

In FIGS. 1 and 2, a spine for flexible hoses 11 is illustrated. The spine 11 includes a plurality of rib members 13, each of which includes at least three ribs 15 disposed radially about a center 17. In the particular embodiment illustrated in FIG. 1, four ribs 15 are shown. It should be noted that the number of ribs may vary, depending upon the characteristics desired to be achieved in the flexible hose in which the spine 11 is to be inserted. The ribs 15 should preferably be disposed at regular angular intervals about the center 17. For example in an embodiment with three ribs 15 the preferred angle between the ribs would be approximately 120°. While in an embodiment with four ribs 15 the angle between the ribs 15 is preferably approximately 90°. Coupling each adjacent pair of rib members 13 is a connecting member 19. The connecting member 19 is attached to the center of the adjacent pairs of rib members 13. Alternatively, the connecting member 19 may be integrally formed, or extruded in the same operation as the rib members 13. The connecting member 19 are therefore rather flexible in bending while stiff when loaded axially. The individual ribs 15 may be tapered outwardly from the center to reduce their cross-sectional area while increasing their strength characteristics when in use.

Figure 3:
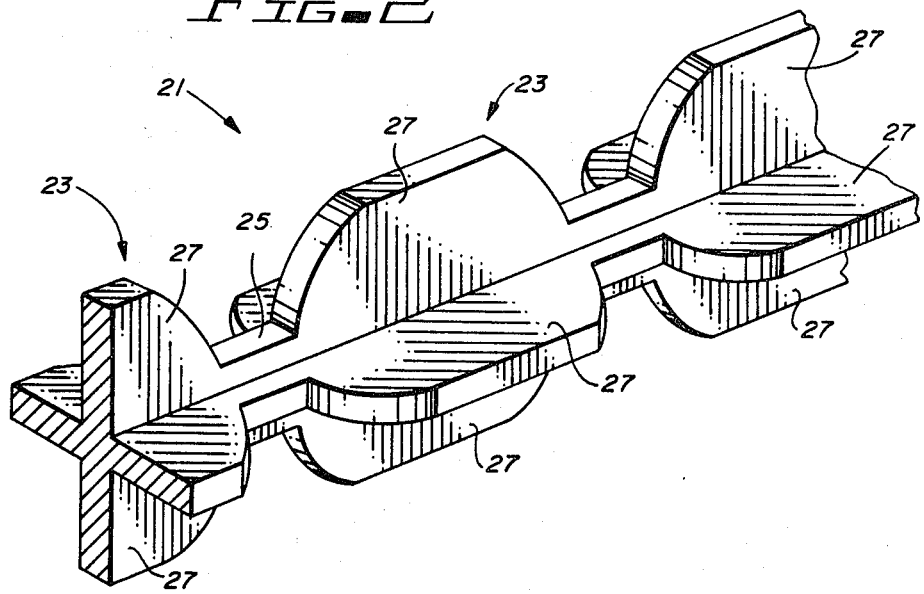
FIG. 3 is a perspective view of an alternate embodiment of a spine for flexible hoses.

Illustrated in FIG. 3 is an alternate embodiment of a spine 21 which can be extruded in plastic. In the embodiment of FIG. 3, an integral piece, including a rib member portion 23 and a connecting portion 23 is illustrated. The rib portion 23 is essentially configured as a "cross" in cross-section and it is coupled to an adjacent rib portion 23 by the connecting portion 25. The connecting portion 23 is formed by creating notches in the individual ribs 27. The lessened cross sectional area of the connecting portion 25 renders it substantially flexible under bending stresses thereby effectuating the same purpose as the connecting member 19 illustrated in FIG. 1. An alternate embodiment, illustrated in FIG. 4, utilizes an integral extruded piece 28 having a plurality of radially extending ribs 29. Unlike the previous embodiment, the embodiment illustrated in FIG. 4 does not have notches 25 since plastic material of suitable flexibility could be used.

Figure 4:
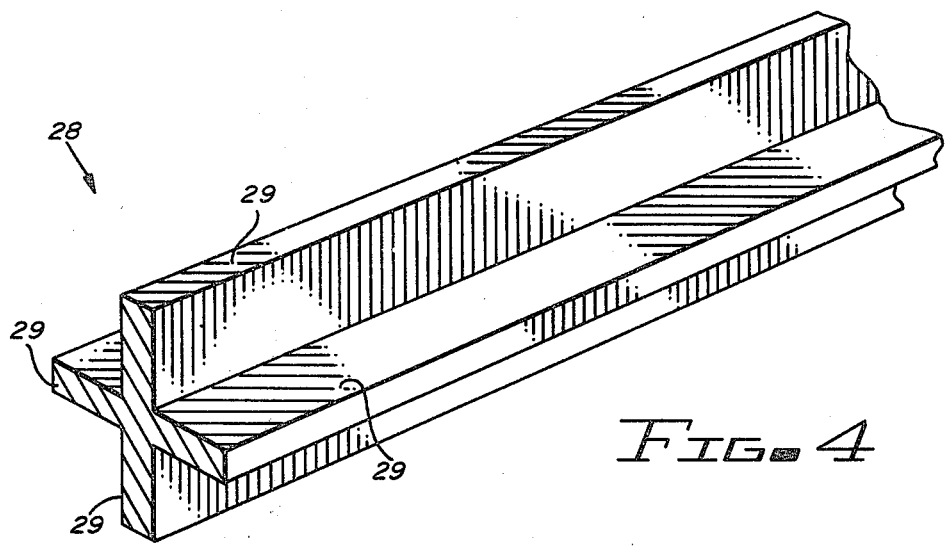
FIG. 4 is a perspective view of another alternate embodiment of the spine.
Figure 5:
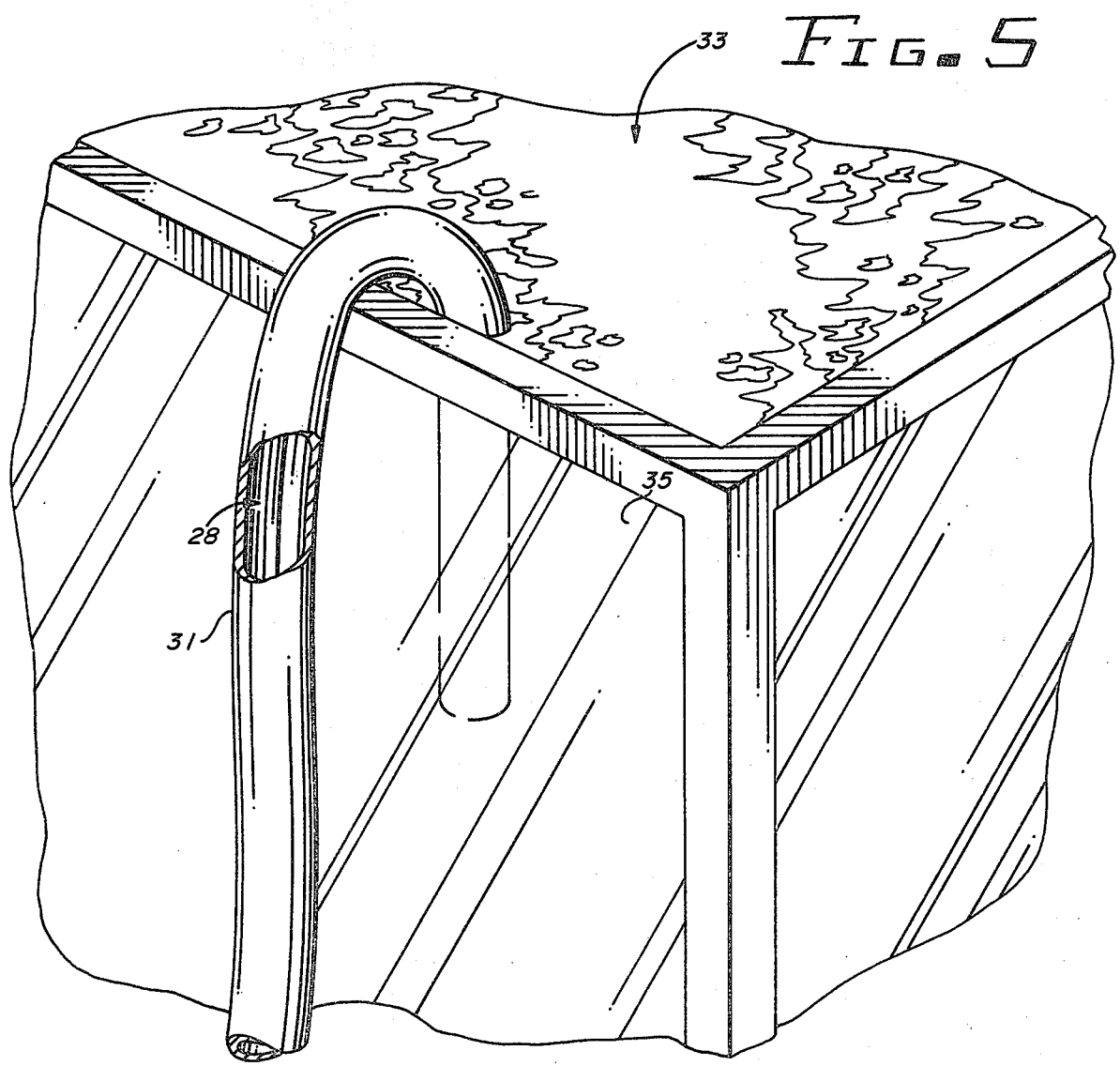
FIG. 5 is a perspective view of an air hose for use in an aquarium incorporating the spine according to the present invention.

Illustrated in FIG. 5 is one of the uses of the spine for flexible hoses. The particular use illustrated in FIG. 4 is an air supply hose 31 for an aquarium 33. The air supply hose 31 must bend over a glass plate 35 over a relatively tight turning radius. If the air hose 31 is kinked it may jeopardize the delivery of the air supply to the aquarium with the resulting loss of the specimens contained therein. Kinking is avoided by inserting a spine 11 or 21 (such as illustrated in FIGS. 1 and 3). The spines may be extruded of any length and cut to the desired length. The spine 11 or 21 is inserted in the air hose 31 which is then wrapped around the end plate 35. The individual ribs (e.g. 15 and FIG. 1) help maintain the structural integrity of the cylindrical shell which comprises the hose 31 while the connecting members 19 yield the necessary bending flexibility to enable the hose to be bent around the end plate 35.

It will thus be seen that the objects set forth above among those made apparent from the proceeding description are efficiently attained, and, since certain changes may be made in the above constructions without departing from the scope of the invention, it is intended that all matter contained in the above description or shown in the accompanying drawings shall be interpreted as illustrative and not in a limiting sense.

I claim:

1. A device for preventing kinks in air hoses for aquariums comprising:
   a plurality of rib members each having a plurality of radially disposed ribs;
   means extending between adjacent ribs for attaching the center of each of said rib members to the center of an adjacent one of said rib members, said means for attaching being substantially flexible under bending stresses; and wherein
   said rib members and said attaching means are integrally formed from a flexible extruded plastic material.

2. The device of claim 1 wherein each of said rib members comprises:
   a central portion, and
   at least three ribs extending radially from said central portion.

3. The device of claim 2 wherein said ribs are substantially equiangularly disposed about said central position.

4. The device of claim 1 wherein said means for flexibly attaching comprises:
   a slender flexible member attached to the center of each adjacent pairs of rib members.

5. The device of claim 1 wherein each rib of said rib member extends outwardly from the center of the rib member a distance substantially equal to the internal diameter of the air hose.

6. The device of claim 1 wherein each of said ribs on each of said rib members is tapered outwardly from the center of said rib members.

7. The device of claim 1 wherein each of said rib members comprises a cross-shaped member having four radially disposed ribs of approximately equal lengths disposed substantially equiangularly about the center.

8. A combination aquarium air hose and device for preventing kinks in the air hose comprising:
   an aquarium air hose of flexible plastic;
   an extruded plastic member of predetermined length extending longitudinally through said hose and having at least three radially disposed ribs extending through the length of the extruded member said extruded member is provided with a plurality of notches on said ribs at regular intervals whereby the bending strength of the extruded member is substantially lessened at the notches thus allowing for easy bending at the notches; and wherein said extruded plastic member bends with said air hose and said rib members preventing kinking thereof.

9. A device as recited in claim 8 wherein the radial dimension of each rib corresponds to the inner radius of said air hose.

* * * * *